United States Patent
Bendick et al.

Patent Number: 5,700,543
Date of Patent: *Dec. 23, 1997

[54] ELONGATE COMPOSITE STRUCTURAL MEMBER AND METHOD OF MAKING

[76] Inventors: Harry J. Bendick, 182 Carmarthen Way, Granville, Ohio 43023; Bret M. Kraner, 106 Maple St., Hebron, Ohio 43025

[*] Notice: The term of this patent shall not extend beyond the expiration date of Pat. No. 5,529,839.

[21] Appl. No.: 585,721

[22] Filed: Jan. 16, 1996

Related U.S. Application Data

[63] Continuation of Ser. No. 274,491, Jul. 13, 1994, Pat. No. 5,529,839.

[51] Int. Cl.⁶ .............. B32B 3/26; B32B 5/18; B32B 5/20
[52] U.S. Cl. .......... 428/71; 428/111; 428/309.9; 428/317.9; 428/318.8; 442/30; 442/56
[58] Field of Search .............. 428/71, 111, 247, 428/248, 282, 294, 295, 309.9, 317.9, 318.8, 906; 442/30, 56

[56] References Cited

U.S. PATENT DOCUMENTS

| | | | |
|---|---|---|---|
| 3,286,004 | 11/1966 | Hill et al. | 264/45 |
| 3,616,171 | 10/1971 | Hoskinson, Sr. | 161/160 |
| 4,119,583 | 10/1978 | Filip et al. | 521/103 |
| 4,128,963 | 12/1978 | Dano | 264/46.6 |
| 4,129,634 | 12/1978 | Cecka et al. | 264/45.3 |
| 4,207,278 | 6/1980 | Cowen et al. | 264/46.4 |
| 4,338,270 | 7/1982 | Uffindell | 264/46.4 |
| 4,379,103 | 4/1983 | Doerfling | 264/45.5 |
| 4,469,733 | 9/1984 | Seddon | 428/109 |
| 4,680,214 | 7/1987 | Frisch et al. | 428/107 |
| 4,714,577 | 12/1987 | Nagamoto et al. | 264/46.6 |
| 4,828,897 | 5/1989 | Staneluis et al. | 428/71 |
| 5,529,839 | 6/1996 | Bendick et al. | 428/295 |

Primary Examiner—Marion E. McCamish
Assistant Examiner—Blaine R. Copenheaver
Attorney, Agent, or Firm—Francis T. Kremblas, Jr.

[57] ABSTRACT

An elongate composite structural member and method of making the same which is particularly useful for forming the handle of hand-held striking and prying tools or implements. The elongate structure member comprises a foamed in place molded resin composition core and outer skin layer which is reinforced with intermediate layer of structurally strong, unidirectional oriented fibers. The expanded foam resin, intermediate fiber layer and the expanded foam resin outer skin are bound together by the cured foamed resin composition formed during the molding process to form a strong, integral composite structure.

2 Claims, 2 Drawing Sheets

ELONGATE COMPOSITE STRUCTURAL MEMBER AND METHOD OF MAKING

This application is a continuation of our application Ser. No. 08/274,491, filed on Jul. 13, 1994 now Pat. No. 5,529,839 issued Jun. 25, 1996.

TECHNICAL FIELD

The present invention relates generally to elongate hand held working implements and particularly to a novel structural composite for an elongate handle particularly useful for striking and prying tools and a method of making the same which are molded with a foamed resin integral core and skin containing a reinforcing layer of strong, unidirectional fibers.

BACKGROUND ART

There has been several attempts by those skilled in the art to develop an improvement over the traditional wood handles for striking or prying tools such as shovels, picks, axes, claw hammers and the like.

It is well-known that strong unidirectional fiber sheets can be incorporated into elongate shapes, such as baseball bats, golf club shafts, tennis rackets and the like, however, such methods are relatively complex, too expensive, or lack some characteristics which deem them less than fully satisfactory for less expensive tool handles and the like.

There are many examples of prior articles molded in various shapes and constructed with pre-formed expanded foam cores covered by an outer skin of a different material and some having a foam core covered with a unidirectional sheet of fibers for strength.

However, the prior art has yet to find a satisfactory construction utilizing a foamed in place core and reinforcing fiber construction covered by a suitable foam skin which offers the benefits of high resistance to bending moments and strength and which can be made using a relatively simple and inexpensive molding process.

BRIEF DISCLOSURE OF INVENTION

The present invention relates generally to a structure and method for making elongate handles or the like for striking and prying tools or implements and particularly, to a novel method and structure for such elements employing a composite structure comprising an integrally formed foamed in place core reinforced by a sheet of unidirectional fibers covered by a simultaneous formed outer skin of the same foamed core material.

In accordance with the present invention, a mold cavity is provided in the form of the elongated structure desired. A sheet of unidirectional fibers, such as fiber glass for example, and preferably a sheet of non-woven natural fibers, such as cellulosic fibers, are rolled around a mandrel to form a tubular element. This layered tubular assembly is positioned in the mold cavity and arranged with the layers near but spaced from the inner walls forming the cavity. A suitable foamable resin composition is then introduced into the mold cavity interiorly of the fiber tubular assembly.

The mold cavity is then sealed and the foam resin composition expands creating pressure which presses the layers of the tubular element outwardly toward the inner walls of the cavity.

The layers of the fiber glass and cellulosic fiber are not pre-impregnated with a resin binder and are permeable to the expanding foam resin such that the foam resin may both wet and penetrate through the layers of the fiber glass and cellulosic fibers. The action of the expanding foam not only causes the tubular element to expand into the shape of the mold, but also causes the portion of the expanding foam which penetrates the fiber layers to density to an even greater degree upon contact with the inner walls of the cavity to form a thin, relatively dense, foam skin layer over the tubular assembly of glass and cellulosic fibers.

Upon cooling and curing the foam core, the tubular fiber elements and the foam outer skin are intimately bound together in an integral structure.

The resulting product is a strong, elongate member possessing excellent resistance to bending moments which is provided with a foam core and foam outer skin reinforced by the intermediate layer of unidirectional glass fiber.

The member can be made in a constant or varying diameter along its length in an appropriate shaped mold and the process is simple, relatively inexpensive and easily controlled compared to prior art methods.

Further, the density of the foamed core and the outer skin may be conveniently controlled to provide a wide variety of advantages over wood or other foamed articles in a very practical economic manner.

DETAILED DESCRIPTION

Figure 1:
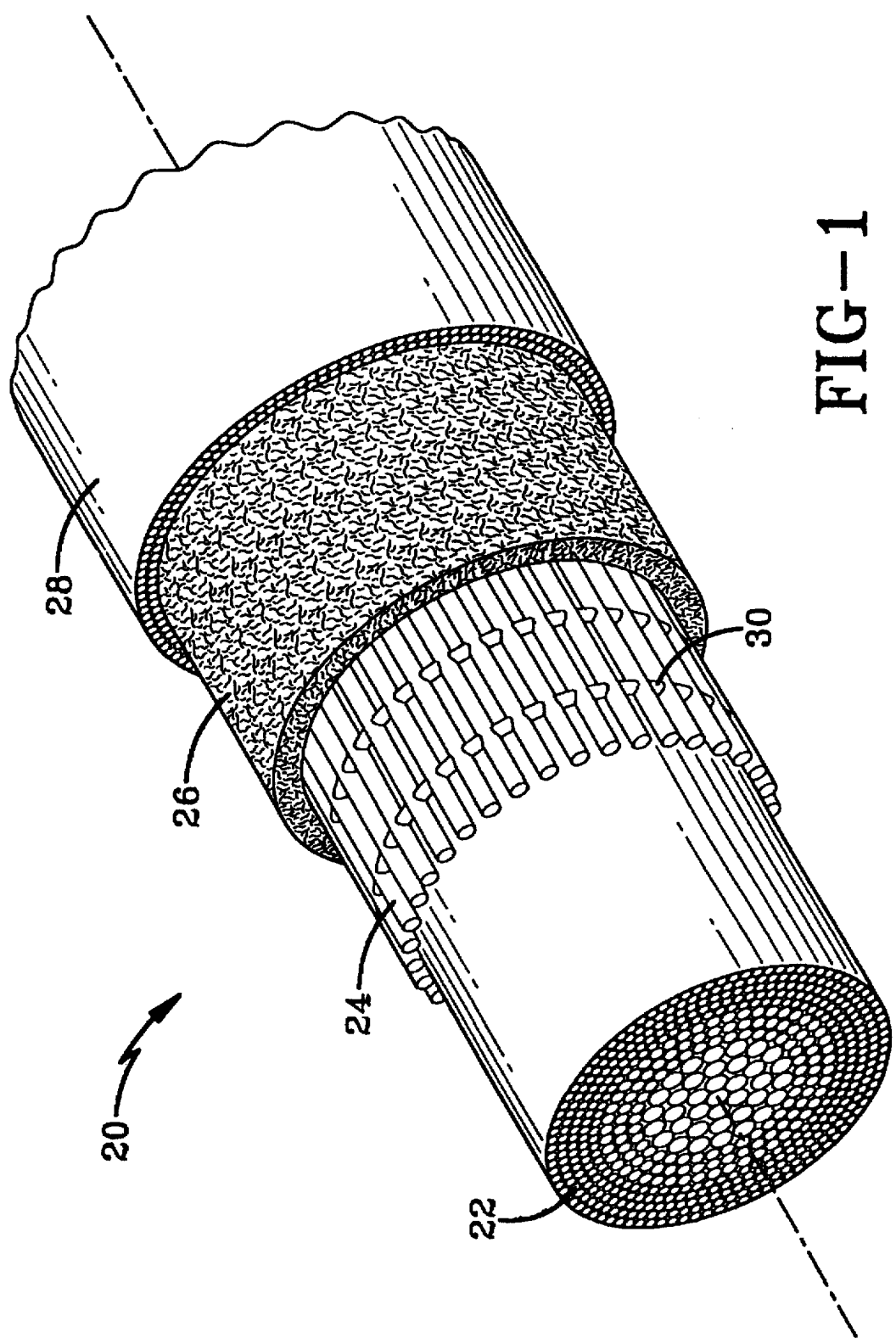
FIG. 1 is a perspective diagrammatic view of a portion of an elongate section of a structural member constructed in accordance with the present invention, the various layers of components making up the structure are partially removed to better illustrate their relationship to one another.

A portion of an elongate structural member, indicated generally at 20, which may function as a handle for a prying or striking tool or a similar object and which is constructed in accordance to the present invention is shown in FIG. 1.

Member 20 comprises an inner core of an expanded foam resin composition 22, a first layer made of a sheet of unidirectional fibers 24, a second layer made of preferably a cellulosic felt material 26, and a dense outer skin 28 comprised of the same expanded foam resin composition as core 22.

Member 20 is formed in a mold where first layer 24 and second layer 26 are first cut from a sheet of the selected material to the appropriate configuration and rolled about a mandrel to form a tubular shape. In the case of a constant diameter elongate structural member, the width of each strip of the sheet material comprising layers 24 and 26 may be essentially constant. However, if the member 20 is selected to have a varying diameter along its length, such as the shovel handle shown in FIG. 2, each sheet preferably will be cut with a varying width along its length to conform to the varying diameter configuration desired in the final product and, of course, the elongate mold cavity used to form the final product. If it is deemed desirable for strength or other purposes, multiple layers of sheet 24 could be employed as may be appropriate for a given application.

First layer 24 is essential and comprises a sheet of strong unidirectional fibers, such as glass, graphite, boron or the like which are readily commercially available and well-known to those skilled in the art. For shovel handles and similar tools, glass fibers are preferred and such sheets are readily commercially available. The parallel glass fibers are stitched together by transverse nylon threads, such as at 30, in a conventional manner well-known to those skilled in the art. The fiber sheet is not impregnated with a binder resin or adhesive and is permeable to the expanding resin composition used to form the core 22.

Second layer 26 is preferably made of a sheet of randomly dispersed cellulosic fibers which has a texture and consistency of conventional paper towels.

Second layer 26 provides no reinforcing strength to the member 20 and its function is to merely act as a protective layer in the finished product to reduce possible exposure to the glass fibers by the user should the expanded foam outer skin become worn or marred during use. This layer is also permeable to the expanding foam resin composition used to form core 22 and is not impregnated with any additional binding resins which would serve to bind layer 26 to layer 24 or outer skin 28.

This second layer is primarily a precautionary or safety measure particularly for those applications wherein the structural member will be used for hand-held implements or tools and the outer skin is likely to be subjected to frictional wear and tear over time which may eventually expose the user's hands to the underlying glass fiber layer 24.

The structural strength and integrity of member 20 is essentially derived from the unidirectional sheet of fibers in first layer 24 as neither core 22 nor the outer skin 28, both made of the same expanded foam composition provide sufficient strength or resistance to bending moments for typical applications of such tools standing alone.

However, core 22 does provide a means to vary the apparent properties of the structural member with respect to weight which may be employed to provide a member 20 which closely resembles the wood used in conventional handles for striking tools, for example, or for other applications wherein a particular weight range is deemed desirable. In the same manner, the expanded foam composition used for core 22 and skin 28 may be chosen to reduce the overall weight or to make a more dense outer skin during the molding process of the present invention as will be described in detail later herein.

It is essential that the first layer 24 of unidirectional fibers and the second layer 22, if used, be permeable to the expanding foam resin composition such that these layers become wetted by the foam resin composition and also permit a portion of the expanding foam composition to pass through to form the outer skin 28 during the molding process.

During the expansion phase, the expanding resin composition forces layers 24 and 26 into the accurate configuration of the mold cavity and simultaneously permeates through these layers to form the relatively thin outer skin 28. Upon curing, the foam resin functions as a strong binding agent to integrally fix the elements together to form an integral, composite structure.

Since the expanding foam also functions to bind the core, the first and second layers and the skin together, neither the first layer of glass fibers 24 or the second layer 26 need be pre-impregnated with a resin binder adhesive typically used in prior art processes to join the layers to one another or to the core or to an outer skin. The binding of the components of the composite structure of the present invention is accomplished solely by the expanded foam resin composition which forms core 22 and also which permeates into and through the first and second layer to simultaneously form the outer skin 28.

This aspect of the present invention not only simplifies the process, but further allows the expanding foam which penetrates through layers 24 and 26 to become relatively dense as it forms a suitably tough protective outer skin having a surface dictated by the finish provided on the walls of the mold.

Many types of expandable foam compositions may be suitable for purposes of the present invention which exhibit the necessary characteristics desired. However, particularly suitable compositions are those organic polymer foamable resins of either the polyurethane or modified polyisocyanurate family. These two part foaming systems are generally commercially available from companies such as General Latex and Chemical Corporation in Ashland, Ohio sold under the trademark "VULTAFOAM" and particularly those referred to by the trade designation 16-L-700 series wherein numerals following the 7 denote the free rise density of the system in pounds per cubic foot (pcf).

Such systems are available with a variety of free rise density properties measured in pounds per cubic foot in the range of about 8 to 20 pcf. Upon mixing of the resin system with water or other suitable blowing agents to form a liquid mixture, they possess relatively short gel and rise times.

Depending upon the application, other compositions having a lesser or greater free rise density value may be useful as well as those which may have different gel or rise times as is well-known to those skilled in this art. Typically, water is the preferred blowing agent for such systems.

For example, for shovel handle applications, a two-part foaming system of the type described above having a free rise density of approximately 20 pcf in a suitable amount selected for a particular mold cavity volume provides a finished product having a density of approximately 65 lbs per cubic foot. Shovel handles having this density appear to work well and closely compare to the density of natural white ash wood. Such handles therefore provides a similar feel to the user as a natural wood handle.

Figure 2:
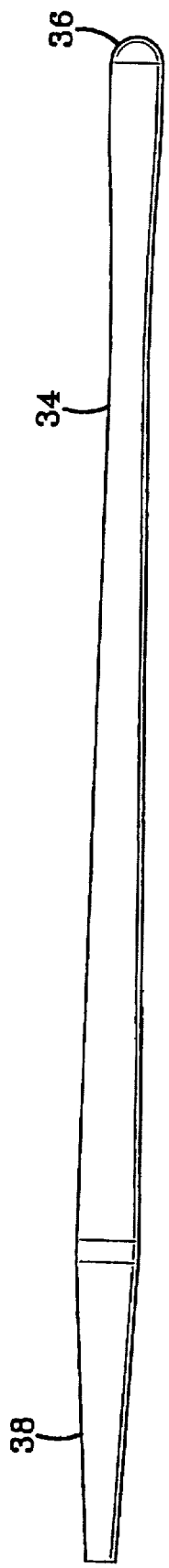
FIG. 2 is a side elevational view of a typical configuration of a shovel handle constructed in accordance with the present invention and illustrating the designed variance in the handle diameter along its length

A molded composite of the present invention having a structure as described in FIGS. 1 and 2 and a final density of about 65 lbs per cubic foot was tested for resistance to bending moments and found to be at least equal and generally better than conventional, commercially available, wood shovel handles of good quality.

The composite shovel handle tested had a varying diameter such as the structural member 34 shown in FIG. 2 which very closely compares to the desirable configuration of quality wood shovel handles used for heavy duty manual digging applications. As is well-known to those skilled in the art, this type of varied tapered configuration is desirable to permit bending of the handle during a prying type maneuver when digging into the ground to store energy which aids the user in prying the material loose from the ground prior to lifting it away upon the head of the shovel.

In a preferred method of making a structural member 20 in the form of the shovel handle 34 shown in FIG. 2, a two part mold is conventionally prepared having a generally cylindrical cavity with varying diameters along its long axis conforming to the desired configuration of the shovel handle 34. The mold preferably has a flat parting line separating the upper and lower sections extending axially along the length of the mold in a well-known conventional manner.

Preferably, the mold is hinged at one end and may be clamped at the opposing end in a closed position. The clamped end may be held closed by either hydraulic pressure or mechanical locks in a conventional manner well-known to those skilled in the art.

One end of the mold includes a closeable injection port adapted to sealingly receive an injection tube operatively connected to a supply of the desired foamable resin composition described earlier herein. The mold port, of course, will include conventional means to permit its closure after the injection tube is retracted to seal the mold cavity during the expansion of the foam resin system.

The reinforcing first layer 24 and the protective second layer 26 are prepared by cutting sheets of an unidirectional glass fibers and a cellulosic felt paper material respectively into elongate strips which vary in width to conform to the varying diameter of the selected configuration of the final product. A strip of the first and second layer are then superimposed over one another, the second layer being under the first, and then they are rolled around the hollow tube which functions both as a mandrel and an injection tube for introduction of the foamable resin system. The injection tube is preferably made of a polyethylene material which resists binding with the foamably resin composition.

With the mold in the open position, the injection tube/mandrel carrying the rolled first and second layer is inserted into the mold cavity with a free end extending outwardly through the injection port into the mold cavity. The mold halves are then closed and clamped and the free end of the injection tube is conventionally connected to a supply of the expandable foam composition.

Next a predetermined amount of the pre-mixed two part foam composition is introduced through the injection tube into the mold cavity as the injection tube is slowly withdrawn at about the same or a slightly slower rate than the fill rate of the resin composition.

Coordination between the withdrawal rate of the injection tube and the fill rate of the foam resin composition will assure that the correct amount of resin has been introduced into the mold cavity as the injection tube is withdrawn from the injection port. The injection port is then quickly closed and locked to completely seal the mold cavity.

After the allotted time necessary to permit the expanding foam resin composition to cure, the mold may be opened and the structural member formed is removed and excess flash may be conventionally removed from the formed member. Any residual offal is conventionally removed from the mold cavity and the cavity is prepared in a conventional manner for the next molding cycle.

The gel time and the rise time for the preferred foamable resin systems disclosed herein are about two to two and one-half minutes respectively. These can be adjusted in a manner well-known to those skilled in the art.

The resultant structural member 34 has a configuration dictated by the mold cavity design wherein the member has a varying cross-sectional diameter as illustrated. In the case of the shovel handle application, one end 36 is rounded while the opposing end is provided with a suitable taper such as at 38 for receiving the neck portion of a conventional head of a shovel.

The composite structural element 34 will suitably accept any conventional form of fastener which may be used to secure the head of the shovel to the tapered end of member 34 in addition to the usual frictional fit between the tapered end and the neck of the shovel head. The layer 24 of unidirectional fibers supplies the necessary strength to anchor any suitable fasteners which may be used.

It should be pointed out that by suitably selecting the free rise density of the foamable resin composition and/or the amount of the composition used in a given mold cavity volume, the final density of the end product can be controlled over a wide range to vary characteristics deemed desirable for a given product application.

Additionally, the relative density of the foam outer skin layer 28 to the core can be altered by suitable choice of the free rise density and/or the quantity of the foamable resin composition used. For example, using a resin composition having a lower free rise density value will result in a final product having a denser outer skin as compared to a resin composition having a higher free rise density value with all other factors being equal.

The protective felt layer 26 as described herein preferably is a cellulosic fiber sheet having a construction similar to conventional household paper towels. The material preferably weighs about 40 to 50 grams per square meter and has a thickness ranging between 10 to 25 mils.

An alternative method of altering the apparent density or actual weight of the structural member can be achieved by employing a second rod or tubular element concentrically positioned within the injection tube in the mold cavity. In this embodiment, the foamable resin composition is introduced into the mold cavity through the injection tube in the channel formed between the outer wall of the rod insert and the inner walls of the injection tube and the injection tube is withdrawn in the same manner as described above herein.

Upon curing, the mold is opened and the structural member formed carries the rod insert which is then removed to leave a hollow center in the structural member. The rod insert can be metal with its surface treated with suitable mold release or it may be a polyethylene material which tends not to bond to the cured resin compositions disclosed herein.

In view of the foregoing description, it should be readily apparent to those skilled in the art that a structural member made in accordance with the present invention has the potential for wide application to a variety of useful articles wherein strength and resistance to bending moments are desirable characteristics and manufacture can be achieved at economically competitive expense.

The structural members of the present invention may be made with a foamed in place core as shown in FIG. 1 or with such a core provided with a hollow center in a tube-like configuration depending upon the most desirable characteristic of a given application.

Further the particular characteristics of density of the final product and the density of the outer skin can be conveniently varied as described herein to meet the desired characteristics of the final product.

In some applications, the second layer 28 of a cellulosic fiber material is highly desirable to assure that the layer of glass or other fibers does not propagate through the outer skin layer of the foamed resin either during manufacture or during its useful life wherein the outer skin will be subject to repeated frictional contact. In other applications, this may not be a significant problem and second layer 26 may be unnecessary and therefore not be included in the composite structure.

We claim:

1. An elongate structural element, comprising in combination:
    a) an elongate compression molded core comprising an expanded resin foam material, said core having a generally cylindrical cross-sectional configuration;
    b) a tubular layer surrounding said core including at least one sheet of longitudinally extending fibers disposed along the length of said core and having said expanded resin foam material forming said core extending into and through said tubular layer of longitudinally extending fibers, said longitudinally extending fibers being selected from the group consisting of fiber glass, graphite and boron;

c) said expanded resin foam material extending through said tubular layer of longitudinal extending fibers forming an outer skin layer overlying said tubular layer of longitudinally extending fibers to intimately bind said core, said longitudinally extending fiber layer, and said outer skin into an integral composite structure.

2. The elongate structural element defined in claim 1, wherein said expanded foam resin material forming said core is formed from a resin having a free rise density of about 8 to 20 pounds per cubic foot.

* * * * *